US007850413B2

(12) United States Patent
Fontana

(10) Patent No.: US 7,850,413 B2
(45) Date of Patent: Dec. 14, 2010

(54) SYSTEM AND METHOD FOR TRANSPORTING INVENTORY ITEMS

(75) Inventor: Richard R. Fontana, Cape Elizabeth, ME (US)

(73) Assignee: Kiva Systems, Inc., Woburn, MA (US)

( * ) Notice: Subject to any disclaimer, the term of this patent is extended or adjusted under 35 U.S.C. 154(b) by 988 days.

(21) Appl. No.: 11/620,170

(22) Filed: Jan. 5, 2007

(65) Prior Publication Data

US 2008/0166217 A1 Jul. 10, 2008

(51) Int. Cl.
*B65G 1/00* (2006.01)

(52) U.S. Cl. .................... 414/331.14; 414/332; 414/590

(58) Field of Classification Search ............ 414/331.14, 414/332, 446, 590; 74/89.29, 89.31, 89.34, 74/89.23

See application file for complete search history.

(56) References Cited

U.S. PATENT DOCUMENTS

| | | | | |
|---|---|---|---|---|
| 5,075,853 A | 12/1991 | Luke, Jr. | ................ | 364/424.02 |
| 6,705,815 B1 * | 3/2004 | Bennett et al. | ................. | 414/9 |

FOREIGN PATENT DOCUMENTS

| | | | |
|---|---|---|---|
| EP | 0 102 706 A1 | 3/1984 |
| EP | 0 192 402 A2 | 8/1986 |
| JP | 2005187120 | 7/2005 |
| WO | WO 2006/044108 A2 | 4/2006 |

OTHER PUBLICATIONS

International Application No. PCT/US2007/087059, PCT Notification of Transmittal of the International Search Report and the Written Opinion of the International Searching Authority, or the Declaration, dated Apr. 17, 2008, 12 pages.

* cited by examiner

*Primary Examiner*—Saúl J Rodríguez
*Assistant Examiner*—Willie Berry
(74) *Attorney, Agent, or Firm*—Baker Botts L.L.P.

(57) ABSTRACT

An apparatus for transporting inventory items includes a housing, a drive module, a docking module, an elevating shaft, and a rotation module. The drive module is capable of propelling the apparatus in at least a first direction. The docking head is capable of coupling to or supporting an inventory holder. The rotation module is capable of inducing rotation in the housing relative to the elevating shaft. The elevating shaft connects to the docking head and is capable of raising the docking head when the housing is rotated relative to the elevating shaft.

18 Claims, 6 Drawing Sheets

SYSTEM AND METHOD FOR TRANSPORTING INVENTORY ITEMS

TECHNICAL FIELD OF THE INVENTION

This invention relates in general to material handling systems, and more particularly, to a method and system for transporting inventory items within an inventory system.

BACKGROUND OF THE INVENTION

Modern inventory systems, such as those in mail-order and e-commerce warehouses, airport luggage systems, and custom-order manufacturing facilities, face significant challenges in providing fast, accurate responses to requests for inventory items. Delays and backlogs in the process of responding to such inventory requests can result in reduced worker productivity, order cancellations, reduced throughput, or other losses. In recent years, automation has improved the speed and efficiency of storing and retrieving inventory items within such systems. Nonetheless, in high volume systems, the speed and efficiency of automated systems may still limit the overall effectiveness of automated systems.

SUMMARY OF THE INVENTION

In accordance with the present invention, the disadvantages and problems associated with inventory systems have been substantially reduced or eliminated. In particular, an inventory system is provided that utilizes improved techniques for transporting inventory holders.

In accordance with one embodiment of the present invention, an apparatus for transporting inventory items includes a housing, a drive module, a docking module, an elevating shaft, and a rotation module. The drive module is capable of propelling the apparatus in at least a first direction. The docking head is capable of coupling to or supporting an inventory holder. The rotation module is capable of inducing rotation in the housing relative to the elevating shaft. The elevating shaft connects to the docking head and is capable of raising the docking head when the housing is rotated relative to the elevating shaft.

In accordance with another embodiment of the present invention, a method for transporting inventory items includes positioning a mobile drive unit beneath an inventory holder at a first location. The mobile drive unit includes a housing, a docking head, and an elevating shaft. The docking head is connected to the elevating shaft, and the elevating shaft is capable of raising the docking head when the housing is rotated relative to the elevating shaft. The method also includes raising the docking head with the elevating shaft by rotating the housing relative to the elevating shaft and docking the mobile drive unit with the inventory holder so that the docking head couples to or supports the inventory holder. Additionally, the method includes moving the mobile drive unit and the inventory holder to a second location.

Technical advantages of certain embodiments of the present invention include an inventory-moving apparatus that increases system throughput, reduces power usage, and utilizes fewer mechanical parts. Additionally, particular embodiments of the present invention may support improved techniques for transporting and manipulating inventory storage components. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
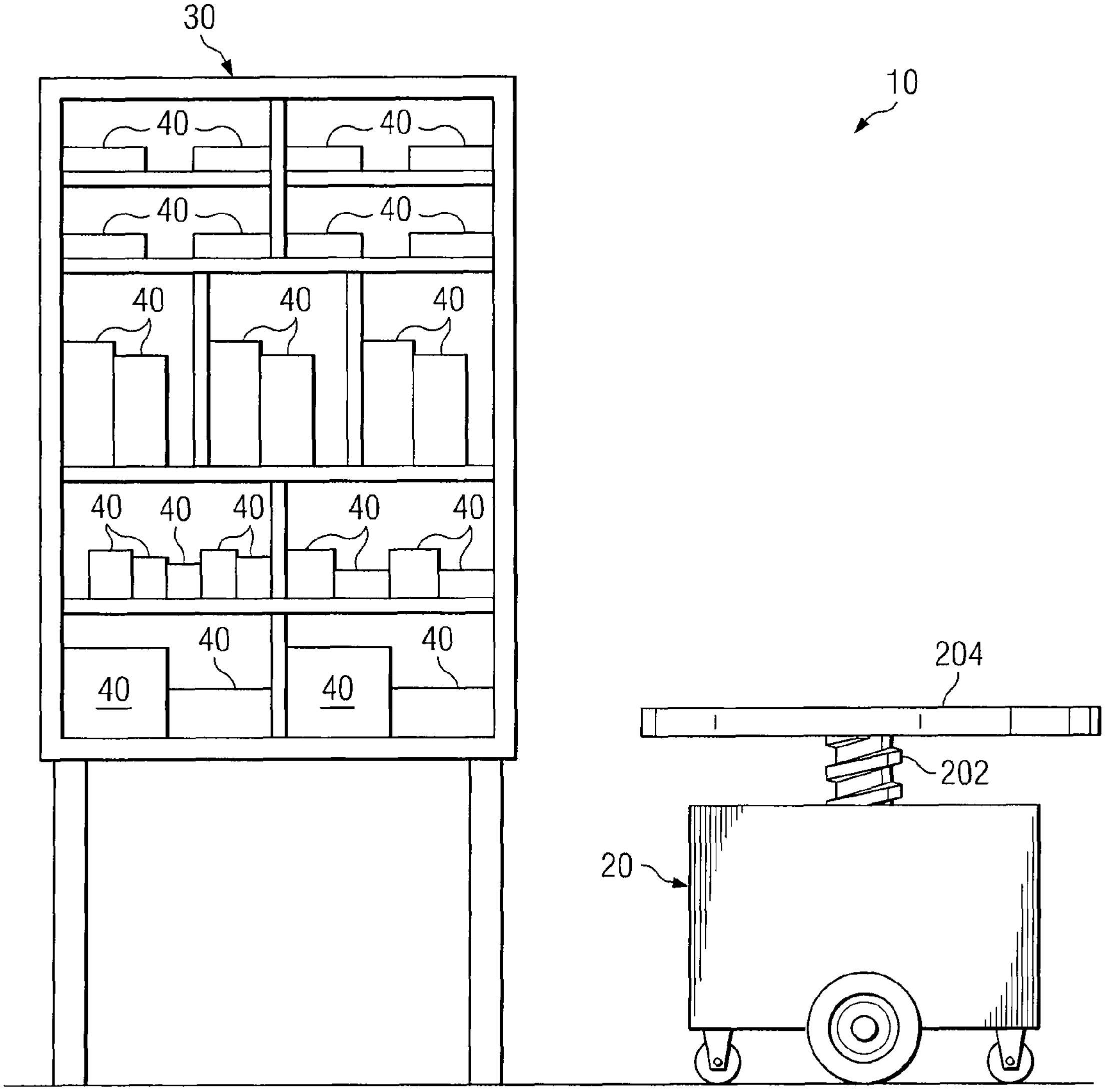
FIG. 1 illustrates an inventory storage system according to a particular embodiment.

FIG. 1 illustrates an inventory system 10 for storing, sorting, and retrieving inventory items 40 that includes a mobile drive unit 20 and an inventory holder 30. Inventory holder 30 stores multiple inventory items 40 of various item types. Mobile drive unit 20 moves inventory holder 30 between designated points within a workspace associated with inventory system 10. In particular embodiments, mobile drive unit 20 supports certain techniques for transporting inventory holder 30 that may result in reduced transport times for inventory items 40, reduced power usage, more refined control of inventory holders 30 during transport, and/or other benefits.

Mobile drive unit 20 is capable of moving within the workspace of inventory system 10 and may include any appropriate components for propelling itself and navigating to a particular destination within the workspace. Additionally, mobile drive unit 20 may dock with inventory holder 30 so that inventory holder 30 is coupled to and/or supported by mobile drive unit 20. When docked with inventory holder 30, mobile drive unit 20 is also capable of propelling and/or otherwise moving inventory holder 30. Mobile drive unit 20 may include any appropriate components for docking with inventory holder 30 and for maneuvering inventory holder 30 while inventory holder 30 is docked with mobile drive unit 20. The components of particular embodiments of mobile drive unit 20 are described in greater detail below with respect to FIGS. 2A-2B and 3A-3D.

Inventory holder 30 stores inventory items 40 on or within inventory holder 30. In particular embodiments, inventory holder 30 includes multiple storage bins with each storage bin capable of holding inventory items 40. Additionally, in particular embodiments, inventory items 40 hang from hooks or bars within or on inventory holder 30. In general, inventory holder 30 may store inventory items 40 in any appropriate manner within inventory holder 30 and/or on the external surface of inventory holder 30. Inventory holder 30 is capable of being rolled, carried, or otherwise moved by mobile drive unit 20. Although FIG. 1 shows, for the sake of simplicity, only a single inventory holder 30, inventory system 10 may include any appropriate number of inventory holders 30. As a result, inventory holder 30 may represent one of several inventory holders 30 storing inventory items 40 in inventory system 10.

Inventory items 40 represent any objects suitable for storage, retrieval, and/or processing in an automated inventory system 10. As one example, inventory system 10 may represent a mail order warehouse facility, and inventory items 40 may represent merchandise stored in the warehouse facility. As another example, inventory system 10 may represent a merchandise-return facility, and inventory items 40 may represent merchandise returned by customers. As yet another example, inventory system 10 may represent a manufacturing facility, and inventory items 40 may represent individual components of a manufacturing kit to be assembled into a finished product, such as electronic components for a customized computer system. More generally, however, inventory items 40 may represent any appropriate objects that may be stored and retrieved in inventory system 10.

Although the description below focuses, for purposes of simplicity, on embodiments of inventory system 10 in which a single mobile drive unit 20 docks with and transports a single inventory holder 30, mobile drive unit 20 may, in particular embodiments, be capable of docking with multiple inventory holders 30 simultaneously and/or docking with additional inventory holders 30 after docking with a first inventory holder 30. Furthermore, in particular embodiments, mobile drive units 20 and inventory holders 30 may be configured to allow multiple different mobile drive units 20 to dock with a single inventory holder 30 or group of inventory holders 30.

Furthermore, although the description below also focuses on embodiments of mobile drive unit 20 that are utilized to transport one or more inventory holders 30 storing inventory items 40 in an inventory system 10, mobile drive unit 20 may be used to transport other types of objects and equipment in other types of systems. For example, instead of inventory items 40, inventory holders 30 may, in particular embodiments, hold other appropriate objects suitable for storage in inventory holder 30. Moreover, in alternative embodiments inventory holder 30 may also be replaced by vacuum cleaners, floor sweepers, inventory checking units, or other suitable equipment, which mobile drive unit 20 may transport within inventory system 10 or other types of systems.

In operation, mobile drive unit 20 is capable of moving between points within a workspace associated with inventory system 10 and, when coupled to inventory holder 30, of transporting inventory holder 30 between locations within the workspace. Mobile drive unit 20 may determine the movement of mobile drive unit 20 autonomously and/or based on commands received by mobile drive unit 20. For example, in particular embodiments, mobile drive unit 20 may receive information that identifies destinations for mobile drive unit 20 from a management device of inventory system 10, from an operator of inventory system 10, or any other suitable party or device. Mobile drive unit 20 may receive the information through a wireless interface, over a wired connection, or using any other suitable components to communicate with an operator or management device of inventory system 10. Additionally, in particular embodiments, mobile drive unit 20 may use fixed objects, such as fiducial marks, located in the workspace as reference points to assist in navigation. In such embodiments, mobile drive unit 20 may be configured to detect fiducial marks and to determine the location of mobile drive unit 20 and/or measure its movement based on the detection of fiducial marks. In general, however, movement of mobile drive unit 20 may, depending on the configuration of mobile drive unit 20 and inventory system 10, be controlled, in whole or in part, by mobile drive unit 20, or any appropriate external devices or parties.

For the sake of simplicity, however, the remainder of this description assumes that mobile drive unit 20 wirelessly receives orders, data, instructions, commands, or information structured in any other appropriate form, referred to here as a "command" or "commands," from a remote component of inventory system 10. These commands identify a particular inventory holder 30 to be moved by mobile drive unit 20 and/or a current location for that inventory holder 30, and a destination for that inventory holder 30. Mobile drive unit 20 then controls operation of motors, wheels, and/or other components of mobile drive unit 20 to move mobile drive unit 20 and/or inventory holder 30.

In response to receiving such a command, mobile drive unit 20 moves to a storage location identified by the command. Mobile drive unit 20 may then initiate a docking process with the identified inventory holder 30. Mobile drive unit 20 may dock with inventory holder 30 in any appropriate manner so that inventory holder 30 is coupled to and/or supported by mobile drive unit 20 when mobile drive unit 20 is docked with inventory holder 30. In particular embodiments, mobile drive unit 20 docks with inventory holder 30 by positioning itself beneath inventory holder 30 and raising a docking head of mobile drive unit 20 until the docking head lifts inventory holder 30 off the ground.

As discussed in greater detail with respect to FIGS. 2A-2C and 3A-3D, particular embodiments of mobile drive unit 20 include an elevating shaft 202 attached to docking head 204. In such embodiments, mobile drive unit 20 may raise docking head 204 by rotating some or all of the remainder of mobile drive unit 20 relative to elevating shaft 202. Depending on the configuration and characteristics of mobile drive unit 20, mobile drive unit 20 may also perform additional steps to maintain the orientation of docking head 204 while mobile drive unit 20 is rotating elevating shaft 202 relative to mobile drive unit 20. For example, in particular embodiments, elevating shaft 202 comprises a screw or other form of threaded shaft that is raised or lowered when certain portions of mobile drive unit 20 are rotated relative to the screw or threaded shaft. Consequently, in such embodiments, mobile drive unit 20 may raise elevating shaft 202 by driving in a circle while the orientation of elevating shaft 202 is fixed.

As a result of the docking process, mobile drive unit 20 may support none, some, or all of the weight of inventory holder 30. Additionally, in particular embodiments, one or more components of mobile drive unit 20 may grasp, connect to, interlock with, or otherwise interact with one or more components of inventory holder 30 to form a coupling between mobile drive unit 20 and inventory holder 30. As one example, in particular embodiments, docking head 202 may include one or more spines that fit within apertures of inventory holder 30 when mobile drive unit 20 docks with inventory holder 30, allowing mobile drive unit 20 to maneuver inventory holder 30 by applying force to inventory holder 30. As another example, in particular embodiments, docking head 202 may include a high-friction surface that abuts a high-friction surface of inventory holder 30 when mobile drive unit 20 is docked with inventory holder 30. In such embodiments, mobile drive unit 20 may utilize friction forces induced between the abutting surfaces to move and rotate inventory holder 30.

After docking with inventory holder 30, mobile drive unit 20 may move inventory holder 30 to a second location, such as an inventory station, where inventory items 40 may be removed from inventory holder 30 (e.g., to be packed for shipping), added to inventory holder 30 (e.g., to replenish the supply of inventory items 40 available in inventory system 10), counted, or otherwise processed. Mobile drive unit 20 may navigate between the first and second location using any appropriate techniques.

In particular embodiments, mobile drive unit 20 is capable of moving inventory holder 30 along a two-dimensional grid, combining forward and backward movement along straight-line segments with ninety-degree rotations and arcing paths to transport inventory holder 30 from the first location to the second location. Additionally, while moving forward or backwards, mobile drive unit 20 may also be capable of performing smaller rotational movements to make navigational corrections or otherwise adjust its heading. When mobile drive unit 20 rotates, mobile drive unit 20 may maintain the orientation of docking head 204. Techniques for achieving this are described in greater detail below with respect to FIGS. 2A-2C and 3A-3D. Maintaining the orientation of the docking head 204 while mobile drive unit 20 rotates may prevent the docked inventory holder 30 from colliding with other nearby inventory holders 30, particularly where inventory system 10 utilizes a densely-packed workspace and relies upon components to perform precisely-constrained movements.

After mobile drive unit 20 arrives at the second location, mobile drive unit 20 may undock from inventory holder 30. Mobile drive unit 20 may undock from inventory holder 30 in any appropriate manner based on the configuration and characteristics of mobile drive unit 20. In particular embodiments, docking head 204 is attached to an elevating shaft 202 that is raised and lowered in response to the rotation of some or all of the remainder of mobile drive unit 20. In such embodiments, mobile drive unit 20 may lower docking head 204 by rotating elevating shaft 202 relative to the remainder of mobile drive unit 20. Moreover, in particular embodiments, mobile drive unit 20 may raise docking head 204 by rotating the relevant portion of mobile drive unit 20 in a first direction relative to elevating shaft 202 and lower docking head 204 by rotating the relevant portion of mobile drive unit 20 in a second direction relative to elevating shaft 202.

Once mobile drive unit 20 has undocked from inventory holder 30, mobile drive unit 20 may move away from inventory holder 30. Mobile drive unit 20 may then begin performing other tasks within inventory system 10. As a result, in particular embodiments, mobile drive unit 20 is capable of transporting any of a plurality of inventory holders 30 between locations within inventory system 10 for purposes of fulfilling orders or completing other tasks involving inventory items 40.

Because mobile drive unit 20, in particular embodiments, is able to dock and undock from inventory holder 30 by rotating elevating shaft 202 relative to mobile drive unit 20, particular embodiments of mobile drive unit 20 may be able to dock and undock from inventory holders 30 in less time and using less power. Furthermore, configuring mobile drive unit 20 to utilize the described rotation movement for docking and undocking with inventory holder 30 may make it possible to reduce the number of mechanical parts included in mobile drive unit 20, as discussed further below. In addition, by maintaining the orientation of inventory holder 30 while rotating, mobile drive unit 20 may maneuver inventory holder 30 without inventory holder 30 colliding with other nearby inventory holders. As a result, particular embodiments of mobile drive unit 20 may provide multiple benefits. Alternative embodiments, however, may provide some, none, or all of these benefits.

Figure 2B:
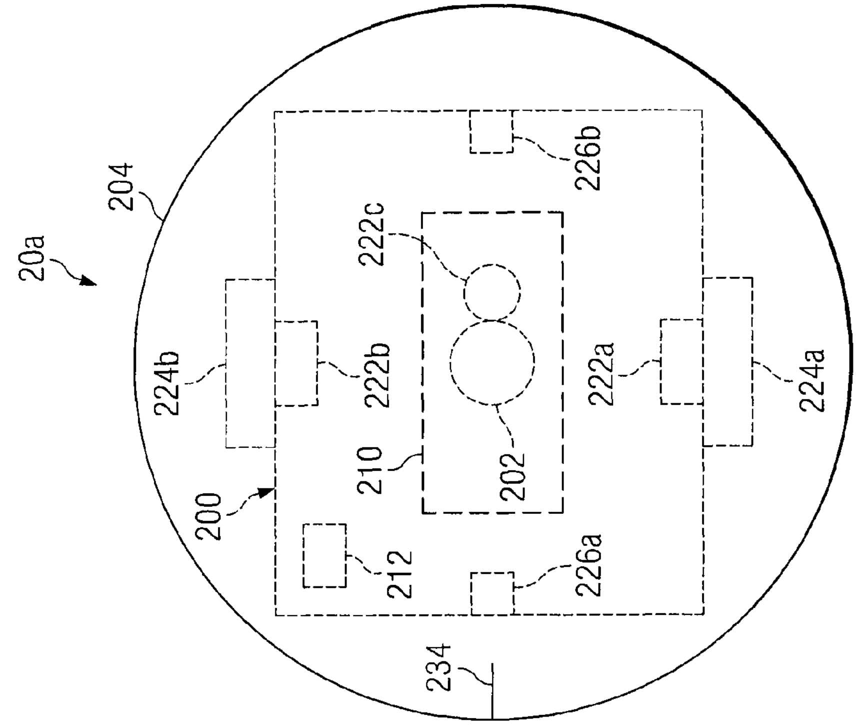
FIGS. 2A-2C present various views of a particular embodiment of a mobile drive unit that may be used in the inventory storage system.
Figure 2A:
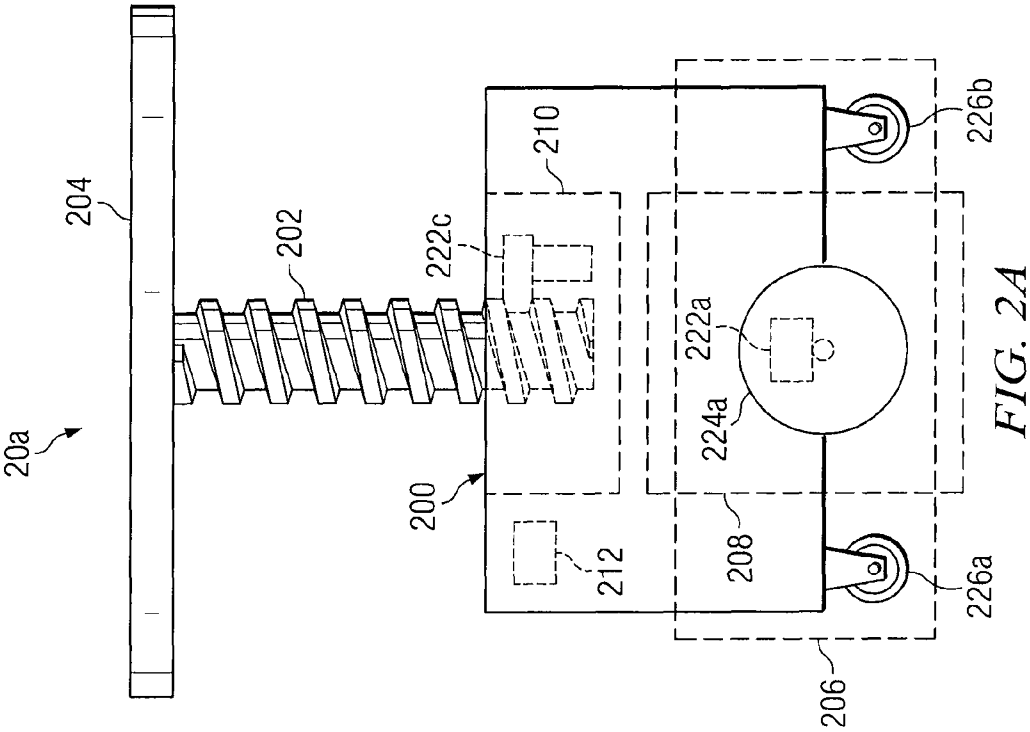

FIGS. 2A and 2B are side and top views, respectively, of a particular embodiment of mobile drive unit 20. In particular, FIGS. 2A and 2B illustrate a mobile drive unit 20*a* that includes elevating shaft 202, docking head 204, a drive module 206, a rotation module 208, a load control module 210, and a processing module 212. Some or all of these components are enclosed in a housing 200.

Housing 200 encloses and/or connects to one or more of drive module 206, rotation module 208, load control module 210, and processing module 212. Alternatively, housing 200 may represent all or a portion of the physical components of any one or more of drive module 206, rotation module 208, load control module 210, and processing module 212. Housing 200 may comprise any appropriate material. In particular embodiments, housing represents a metal or plastic casing that encloses components of drive module 206, rotation module 208, load control module 210, and processing module 212, and includes a cavity that holds elevating shaft 202.

Docking head 204 couples mobile drive unit 20 to inventory holder 30 and/or supports inventory holder 30 when mobile drive unit 20 is docked to inventory holder 30. Docking head 204 may additionally allow mobile drive unit 20*a* to maneuver inventory holder 30, such as by lifting inventory holder 30, propelling inventory holder 30, rotating inventory holder 30, and/or moving inventory holder 30 in any other appropriate manner. Docking head 204 may also include any appropriate combination of components, such as ribs, spikes, and/or corrugations, to facilitate such manipulation of inventory holder 30. For example, in particular embodiments, docking head 204 may include a high-friction portion that abuts a portion of inventory holder 30 while mobile drive unit 20*a* is docked to inventory holder 30. In such embodiments, frictional forces created between the high-friction portion of docking head 204 and a surface of inventory holder 30 may induce translational and rotational movement in inventory holder 30 when docking head 204 moves and rotates, respectively. As a result, mobile drive unit 20*a* may be able to manipulate inventory holder 30 by moving or rotating docking head 204, either independently or as a part of the movement of mobile drive unit 20*a* as a whole.

Elevating shaft 202 attaches docking head 204 to the remainder of mobile drive unit 20*a* and is capable of raising and/or lowering docking head 204. Elevating shaft 202 may include or represent any element capable of being raised or lowered as a result of rotation induced in elevating shaft 202 or portions of mobile drive unit 20*a* in contact with elevating shaft 202. In particular embodiments, elevating shaft 202 may represent a shaft or other element that, when rotated, rises as a result of threading on its surface and/or as the result of bearings or other rolling elements following a sloped track within the cavity that holds elevating shaft 202. As one example, elevating shaft 202 may represent a threaded shaft that rests in a threaded cavity within housing 200. As a result, the threading of the shaft and cavity causes elevating shaft 202 to move upwards or downwards when housing 200 is rotated relative to the elevating shaft 202. In general, however, elevating shaft 202 may represent any appropriate component or components configured to raise or lower as a result of the rotation of housing 200 and/or elevating shaft 202.

Drive module 206 (shown in FIG. 2A only) propels mobile drive unit 20*a* and, when mobile drive unit 20*a* and inventory holder 30 are docked, inventory holder 30. Drive module 206 may represent any appropriate collection of components operable to propel drive module 206. For example, in the illustrated embodiment, drive module 206 includes a pair of actuators 222 (222*a* and 22*b*), a pair of motorized wheels 224 (224*a* and 224*b*), and a pair of stabilizing wheels 226 (226*a* and 226*b*). An actuator 222 is responsible for rotating each of motorized wheels 224. As a result, drive module 206 may move mobile drive unit 20*a* in a forward direction relative to a particular face of mobile drive unit 20*a* by rotating motorized wheels 224 clockwise and in a backward direction relative to that face by rotating motorized wheels 224 counterclockwise. In alternative embodiments, mobile drive unit 20*a* may include an actuator that is capable of rotating motorized wheels 224 in only a single direction and may utilize a differential drive system to rotate itself. In such embodiments, mobile drive unit 20 may achieve backward motion by rotating one-hundred and eighty degrees and then moving forward. More generally, however, drive module 206 may include any appropriate components capable of moving mobile drive unit 20 in any manner suitable for use in inventory system 10.

Rotation module 208 (shown in FIG. 2A only) induces rotation in all, or a portion of, mobile drive unit 20*a* relative to elevating shaft 202. This rotation may represent any rotation of the relevant portion of mobile drive unit 20*a* and/or any rotation of elevating shaft 202 such that the orientation of the relevant portion of mobile drive unit 20*a* changes relative to elevating shaft 202. As a result of this rotation, mobile drive unit 20*a* raises docking head 204 towards inventory holder 30 to facilitate docking of mobile drive unit 20*a* and inventory holder 30. More specifically, in particular embodiments, rotation module 208 raises docking head 204 by inducing rotation in mobile drive unit 20*a* relative to elevating shaft 202 and/or rotation in elevating shaft 202 relative to mobile drive unit 20*a*. Rotation module 208 may represent any appropriate collection of components operable to rotate mobile drive unit 20*a* and/or elevating shaft 202.

Additionally, in particular embodiments, rotation module 208 may include or represent some or all of the components of drive module 206. This may reduce the number of components in mobile drive unit 20*a*, making mobile drive unit 20*a* less expensive to manufacture. For example, as shown in FIG. 2A, rotation module 208 of mobile drive unit 20*a* includes actuators 222*a* and 22*b*. As a result, in the illustrated embodiment, mobile drive unit 20*a* rotates mobile drive unit 20*a* relative to elevating shaft 202 by using actuators 222*a* and 222*b* to rotate motorized wheels 224 in opposite directions. In alternative embodiments, drive module 206 may include only a single actuator for moving mobile drive unit 20*a*. In such embodiments, rotation module 208 may include this single actuator and a differential drive system that interacts with the actuator to rotate mobile drive unit 20*a*. As noted, above however, mobile drive unit 20 may, in general, include any appropriate components capable of rotating the mobile drive unit 20 in any manner suitable for use in inventory system 10.

Load control module 210 controls the orientation of an inventory holder 30 to which mobile drive unit 20*a* is docked. In particular embodiments, load control module 210 may control the orientation of the relevant inventory holder 30 by adjusting or maintaining the orientation of elevating shaft 202 and/or docking head 204. Load control module 210 may include any appropriate components, based on the configuration of mobile drive unit 20*a* and inventory holder 30, for adjusting the orientation of elevating shaft 202, docking head 204, and/or other appropriate components of mobile drive unit 20*a*. Load control module 210 may adjust the orientation of docking head 204 to rotate a docked inventory holder 30, for example, to present a particular face of the inventory holder 30 to a user. Additionally, as described in greater detail below, load control module 210 may maintain the orientation of docking head 204 while the remainder of mobile drive unit 20 is rotating to prevent any rotation in the docked inventory holder 30.

For example, in the illustrated embodiment, load control module 210 includes an actuator 222*c* capable of applying a torque to elevating shaft 202. As a result, in particular embodiments, actuator 222*c* may be capable of inducing a rotation in elevating shaft 202 to change the orientation of inventory holder 30. Additionally, actuator 222*c* may also be capable of applying a torque to elevating shaft 202 that counteracts a torque induced by the rotation of the remainder of mobile drive unit 20*a*. Thus, in particular embodiments, load control module 210 may be capable of maintaining an orientation of inventory holder 30 while mobile drive unit 20*a* is rotating. This may allow mobile drive unit 20*a* to rotate (e.g., to dock with inventory holder 30 or to change its direction of travel) without rotating the inventory holder 30 to which it is docked. Additionally, in alternative embodiments, load control module 210 may represent, in part, a portion of rotation module 208, such as an actuator that is responsible for driving motorized wheels 224 and that is coupled to load control module 210 through a clutch mechanism. When the clutch is engaged, the actuator can provide a counter-rotational torque to elevating shaft 202 that maintains the orientation of elevating shaft 202 and/or docking head 204 despite any rotation in the remainder of mobile drive unit 20.

Processing module 212 monitors and/or controls operation of drive module 206, rotation module 208, and load control module 210. Processing module 212 may also receive information from sensors and adjust the operation of drive module 206, rotation module 208, load control module 210, and/or other components of mobile drive unit 20*a* based on this information. More specifically, processing module 212 may generate control signals and transmit these control signals to the various components of mobile drive unit 20*a* to initiate any or all of their described functionality. Additionally, in particular embodiments, mobile drive unit 20*a* may be configured to communicate with a management device of inventory system 10, and processing module 212 may receive commands transmitted to mobile drive unit 20*a* and communicate information back to the management device utilizing appropriate communication components of mobile drive unit 20*a*.

Processing module 212 may include any appropriate hardware and/or software suitable to provide the described functionality. In particular embodiments, processing module 212 includes a general-purpose microprocessor programmed to provide the described functionality. Additionally, processing module 212 may include all or portions of drive module 206, rotation module 208, and/or load control module 210, and/or share components with any of these elements of mobile drive unit 20*a*.

Thus, overall, particular embodiments of mobile drive unit 20*a* may provide a number of operational benefits. For example, the rotation movement used by particular embodiments of mobile drive unit 20*a* to dock with inventory holder 30 may reduce the time and energy utilized in docking. Additionally, in particular embodiments, load control module 210 may allow portions of mobile drive unit 20*a* to rotate (e.g., for purposes of docking or turning) without changing the orientation of an inventory holder 30 with which mobile drive unit 20*a* is docked. As a result, particular embodiments of mobile drive unit 20*a* may reduce or eliminate collisions between the docked inventory holder 30 and other nearby inventory holders while mobile drive unit 20*a* is rotating. Nonetheless, while mobile drive unit 20*a* may provide such benefits, particular embodiments may provide some, none, or all such benefits.

Figure 2C:
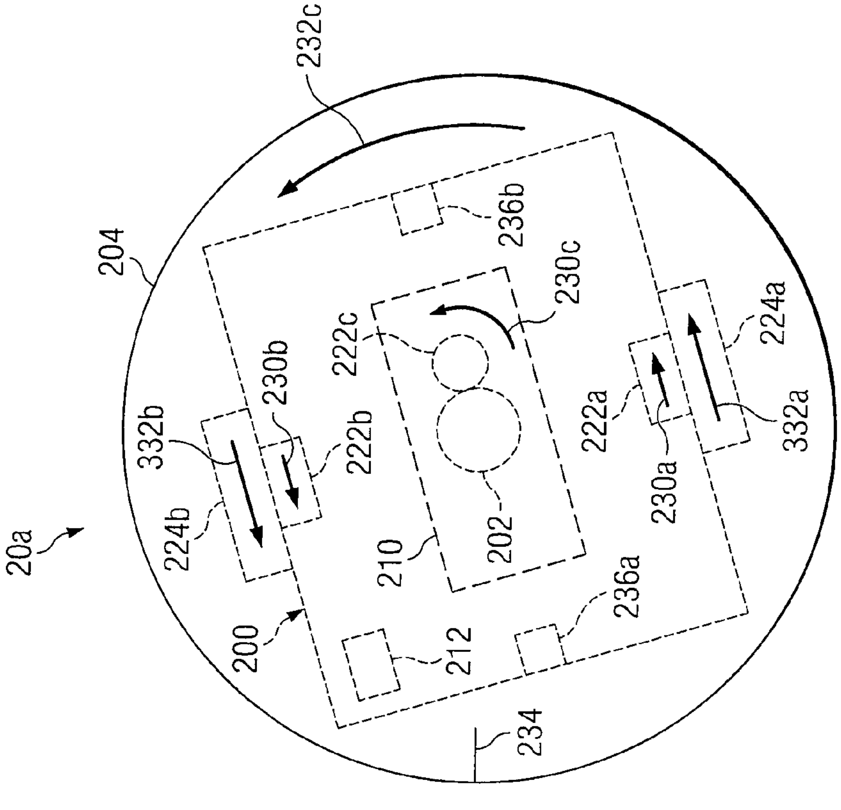

FIG. 2C illustrates the operation of mobile drive unit 20*a* when rotating. In particular, FIG. 2C shows an example of how mobile drive unit 20*a* may rotate while maintaining a substantially constant orientation for docking head 204. In the illustrated example, actuators 222*a* and 222*b* operate to rotate mobile drive unit 20*a* in a counter-clockwise direction, while actuator 222*c* maintains the orientation of docking head 204 (as reflected by the position of mark 234 in FIGS. 2B and 2C).

More specifically, actuator 222*a* applies a torque (shown in FIG. 2C by arrow 230*a*) to motorized wheel 224*a*, while actuator 222*b* applies a torque (shown in FIG. 2C by arrow 230*b*) to motorized wheel 224*b*. This results in the rotation of both of motorized wheels 224*a* and 224*b* (as shown by arrows 232*a* and 232*b*). The rotation of motorized wheels 224*a* and 224*b*, in turn, causes housing 200 and/or other portions of mobile drive unit 20*a* to rotate (as shown by arrow 232*c*). Meanwhile, at an appropriate time before, while, or after this process is initiated, actuator 222*c* applies a torque (shown in FIG. 2C by arrow 230*c*) to elevating shaft 202. Thus, in this example, the torque applied to elevating shaft 202 by actuator 222*c* counteracts any torque applied to elevating shaft 222*c* as a result of the rotation of housing 200 or other portions of mobile drive unit 20*a*. (However, because the torque applied by actuator 222*c* also lifts docking head 204 and any load on docking head 204, the force applied by actuator 222*c* may be different in magnitude from the torque applied to housing 200 by actuators 222*a* and 22*b*.) Consequently, the orientation of docking head 204 remains substantially constant despite the rotation of housing 200 or other portions of mobile drive unit 20*a*. This is illustrated by the similar position of mark 234 in FIGS. 2B and 2C.

In particular embodiments, processing module 212 may be responsible for monitoring and controlling the operation of the various actuators 222 to insure that the torque applied by actuator 222*c* substantially counteracts the torque applied by actuators 222*a* and 222*b* so that docking head 204 experiences no substantial net rotational velocity. As a result, the torque applied by each of the various actuators 222*a-c* may be dynamically determined during operation. In alternative embodiments, actuators 222*a-c* may each be configured to provide a torque of a predetermined magnitude chosen so that, overall, the various torques applied by actuators 222*a-c* produce no rotation in docking head 204.

Figure 3A:
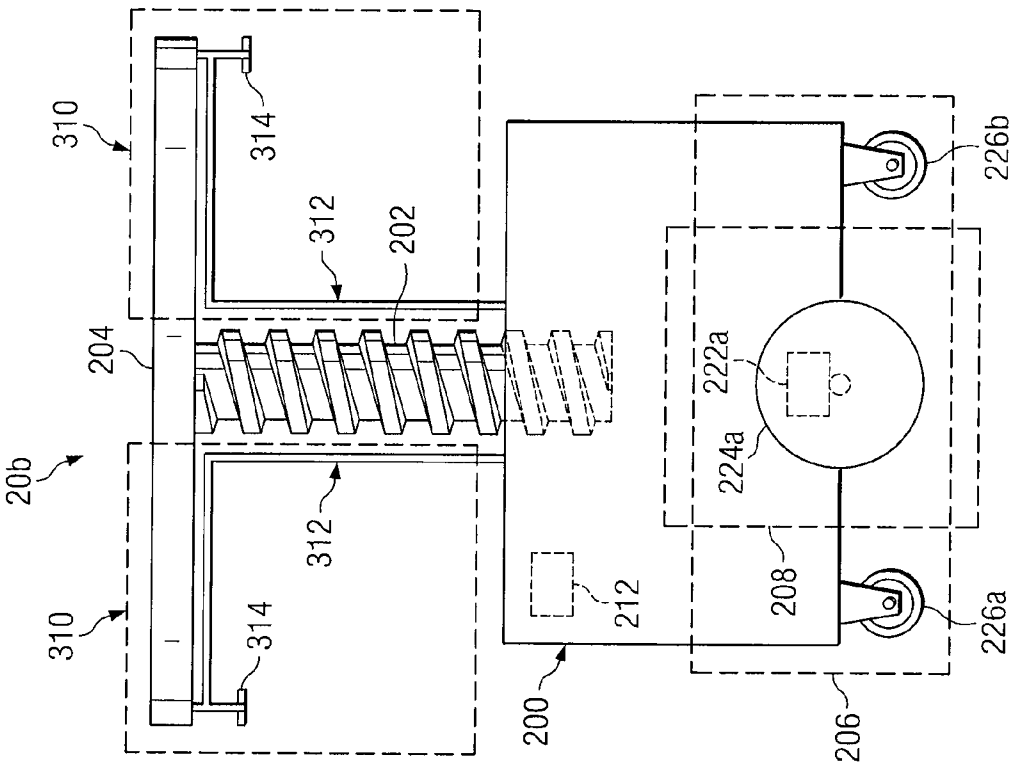
FIGS. 3A-3D present various views of an alternative embodiment of the mobile drive unit.
Figure 3C:
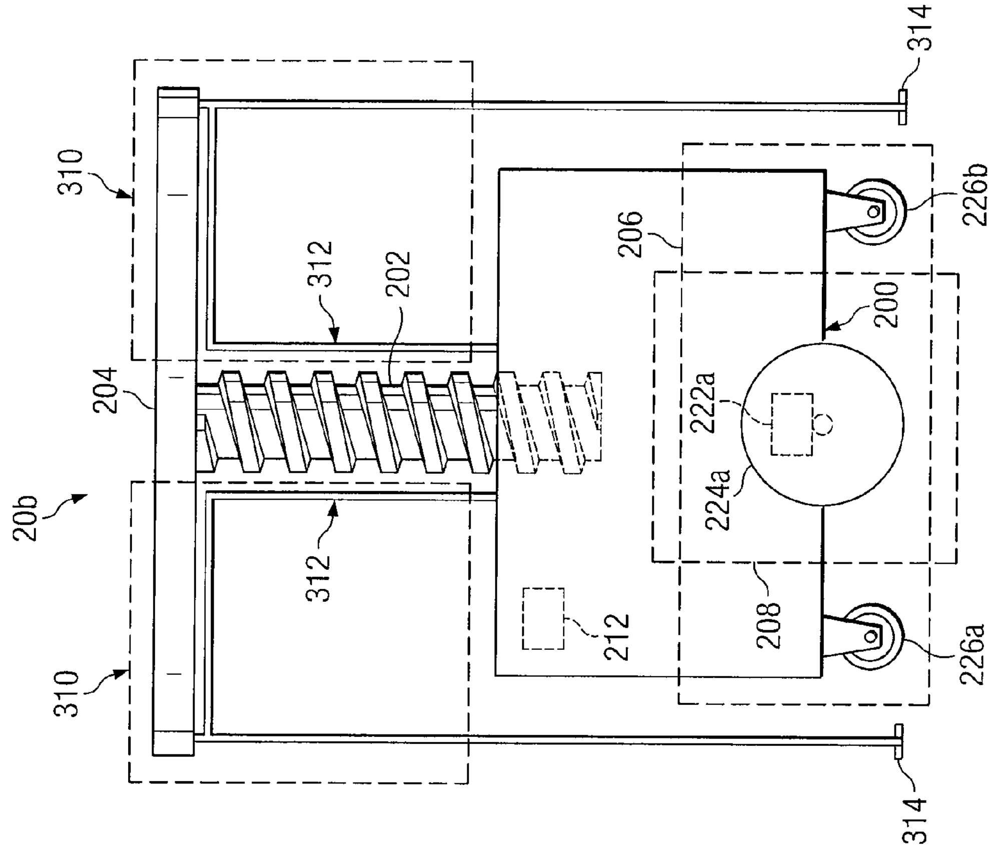
Figure 3B:
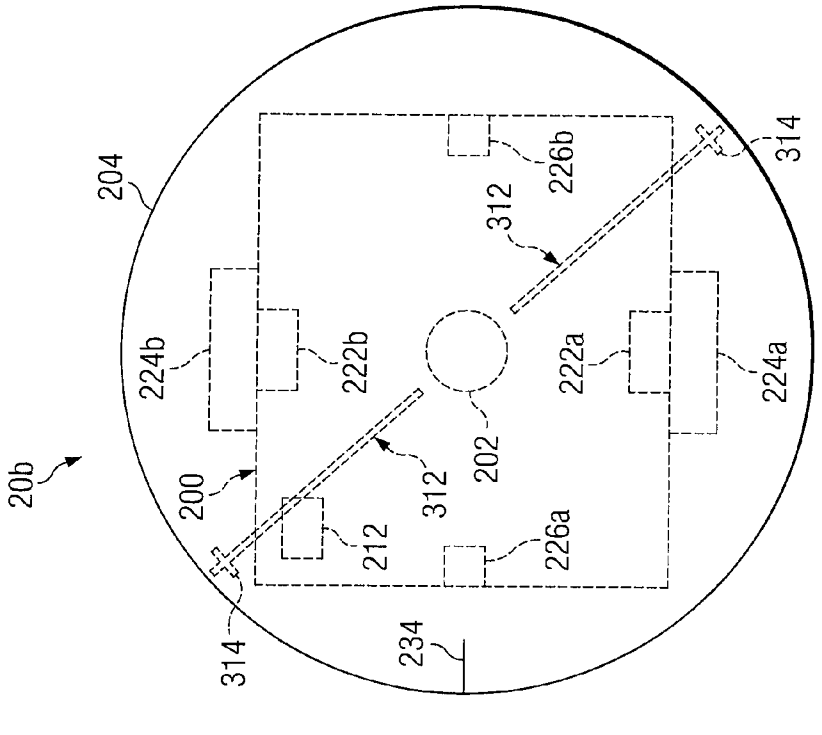

FIGS. 3A and 3B are side and top views, respectively, of an alternative embodiment of mobile drive unit 20. Specifically, FIGS. 3A and 3B illustrate a mobile drive unit 20*b* that includes an alternative embodiment of load control module. In the embodiment of mobile drive unit 20*b* illustrated by FIGS. 3A and 3B, illustrated components represent components similar in content and operation to any similarly-numbered components in FIGS. 2A and 2B.

Load control module 310, like load control module 210 illustrated in FIGS. 2A and 2B, controls the orientation of an inventory holder 30 to which mobile drive unit 20*b* is docked. In the illustrated embodiment, load control module 310 includes a braking element 312 that prevents the rotation of docking head 204 when processing module 212 activates braking element 312. Braking element 312 may represent any appropriate components suitable to passively inhibit the rotation of docking head 204 once activated.

As shown in FIGS. 3A and 3B, an example configuration of braking element 312 includes one or more feet 314 that are attached to docking head 204. When braking element 312 is activated, feet 314 are pressed against the surface on which mobile drive unit 20*b* is resting (as shown in FIG. 3C). As a result, feet 314 apply a torque to docking head 204 that counters the torque that is applied by the rotation of mobile drive unit 20*b*. Consequently, mobile drive unit 20*b*, or a portion of mobile drive unit 20*b*, rotates without the orientation of the docked inventory holder 30 changing.

As shown in FIGS. 3A-3D, particular embodiments of braking element 312 may include feet 314 that are positioned outside housing 200 and that extend wide of housing 200 when activated. Nonetheless, braking element 312 may, in alternative embodiments, include feet 314 that are positioned within an inner cavity of housing 200 and that extend through this cavity within housing 200 when activated. Feet 314 may be extensible or capable of sliding to maintain contact with the surface. More generally, as noted above, braking element 312 may include any appropriate elements configured in any appropriate manner to inhibit the rotation of docking head 204 when activated.

Figure 3D:
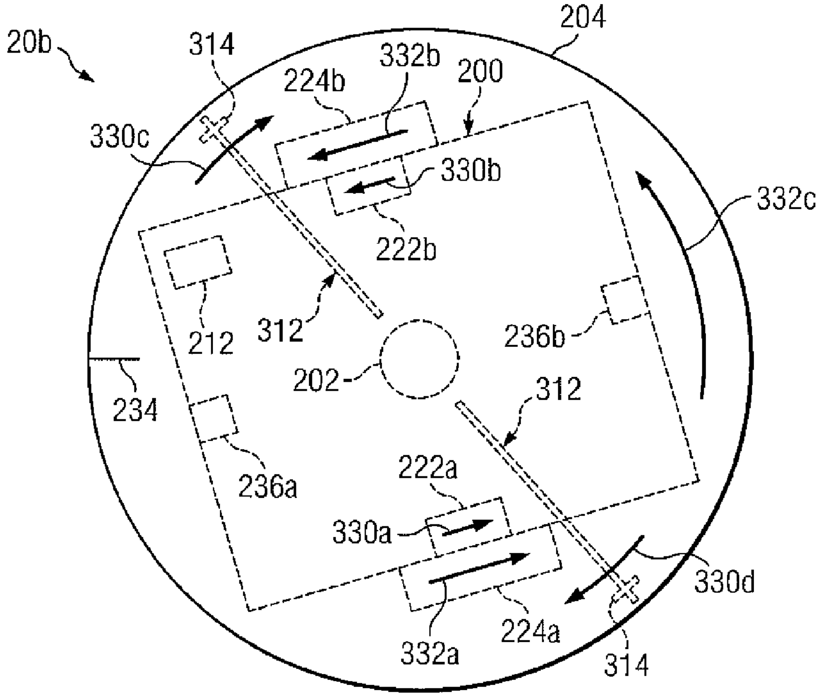

FIGS. 3C and 3D illustrate the operation of mobile drive unit 20*b* when rotating. In particular, FIGS. 3C and 3D show from the side and top, respectively, an example of how mobile drive unit 20*b* may rotate while maintaining the orientation of docking head 204 substantially constant. In the illustrated example, actuators 222*a* and 222*b* operate to rotate mobile drive unit 20*b* in a counter-clockwise direction, while braking element 312 maintains the orientation of docking head 204 (as reflected by the position of mark 334 in FIGS. 3B and 3D).

More specifically, actuator 222*a* applies a torque (shown in FIG. 3D by arrow 330*a*) to motorized wheel 224*a*, while actuator 222*b* applies a torque (shown in FIG. 3D by arrow 330*b*) to motorized wheel 224*b*. This results in the rotation of both of motorized wheels 224*a* and 224*b* (as shown by arrows 332*a* and 332*b*). The rotation of motorized wheels 224*a* and 224*b*, in turn, causes housing 200 and/or other portions of mobile drive unit 20*b* to rotate (as shown by arrow 332*c*).

Meanwhile, at an appropriate time before or after this process is initiated, processing module 212 or another element of mobile drive unit 20*b* activates braking element 312. Mobile drive unit 20*b* is illustrated in FIG. 3C with braking element 312 activated. The embodiment of braking element 312 included in mobile drive unit 20*b* comprises one or more feet 314 that may be deployed when braking element 312 is activated. When feet 314 are deployed, feet 314 press against the surface on which mobile drive unit 20*b* is resting. Friction between feet 314 and the relevant surface may prevent feet 314 from moving while housing 200 and/or other elements of mobile drive unit 20*b* rotate. Because feet 314 are connected to docking head 204 and are prevented from moving, feet 314 may each apply a torque to docking head 204 (shown in FIG. 3D by arrows 330*c* and 33*d*) that opposes any torque applied by the rotation of housing 200 or other portions of mobile drive unit 20*b*. Consequently, the orientation of docking head 204 may remain substantially constant despite the rotation of housing 200 or other portions of mobile drive unit 20*b*. This is illustrated by the similar position of mark 234 in FIGS. 3B and 3D.

As noted above, elevating shaft 202 may represent or incorporate any components suitable to lift docking head 204 in response to rotation of all or a portion of housing 200 relative to elevating shaft 202. FIGS. 4A-4D and 5A-5C illustrate further example configurations of elevating shaft 202 that may be used in particular embodiments of mobile drive unit 20. Although FIGS. 4A-4D and 5A-5C illustrate certain examples embodiments and configurations, elevating shaft 202 and mobile drive unit 20 in general may incorporate or include any appropriate components configured in any suitable manner to provide the functionality described herein.

Figure 4B:
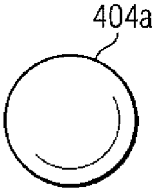
FIGS. 4A-4D illustrate example components and configurations for particular embodiments of the mobile drive unit.
Figure 4A:
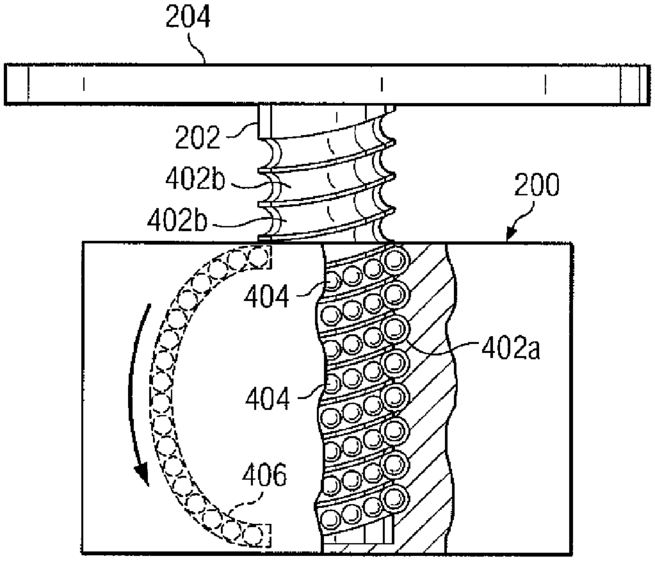

FIGS. 4A-4D illustrate the components of a particular embodiment of mobile drive unit 20 that utilizes bearings 404 to facilitate the rotation of elevating shaft 202 and housing 200 relative to one another. In particular, FIG. 4A shows a partial cutaway view of an embodiment of mobile drive unit 20 that utilizes a recirculating ball screw to raise or lower elevating shaft 202. The example embodiment illustrated in FIG. 4A includes races 402*a* and 402*b*, one or more bearings 404, and a recirculating path 406.

Races 402 comprise pathways in which bearings, rollers, or other rolling or sliding contact elements can move. In particular embodiments, mobile drive unit 20 includes both an inner race 402*a* and an outer race 402*b*. As shown in FIG. 4A, inner race 402*a* may represent a portion of elevating shaft 202, while outer race 402*b* may represent a portion of housing 200. Additionally, in particular embodiments, bearings 404 may be in contact with one or both of inner race 402*a* and outer race 402*b* while rolling or sliding within races 402. Furthermore, either or both of races 402 may be sloped to facilitate the elevation of elevating shaft 202.

Bearings 404 may represent any form of bearings, rollers, or other components capable of rolling along or within races 402 and, in particular embodiments, may abut or contact either or both of races 402 while rolling. In particular embodiments, bearings 404 may be lubricated or made of a low-friction material to facilitate movement along races 402. In general, however, bearings 404 may be comprised of any appropriate material.

Figure 4C:
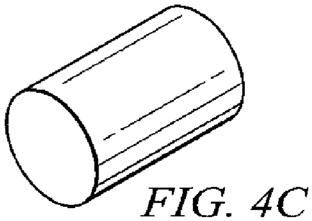
Figure 4D:
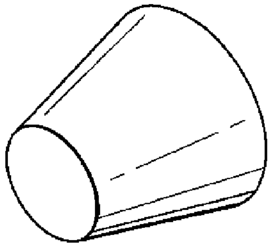

Although FIG. 4A illustrates a particular embodiment of mobile drive unit 20 in which bearings 404 represent ball bearings 404*a* having a substantially spherical shape (as shown in FIG. 4B), bearings 404 may represent rolling components of any appropriate shape. FIGS. 4C and 4D illustrate two example of bearings 404 that may used in alternative embodiments of mobile drive unit 20. More specifically, FIG. 4C illustrates a roller bearing 404*b* having a substantially cylindrical shape, and FIG. 4D illustrates a tapered roller bearing 404*c* having the shape of a tapered cylinder.

Recirculating path 406 comprises a pathway through mobile drive unit 20 that connects one endpoint of outer race 402*b* with the other endpoint of outer race 402*b*. Recirculating path 406 is sized and shaped to allow bearings 404 to pass between the two endpoints. Although the embodiment of mobile drive unit 20 shown in FIG. 4A includes recirculating path 406 for purposes of illustration, particular embodiments of mobile drive unit 20 may be configured to operate without any recirculating path 406.

In operation, inner race 402*a* and outer race 402*b* rotate relative to one another when mobile drive unit 20 rotates housing 200. As a result of the slope of one or both races 402, this rotation also raises or lowers elevating shaft 202. Bearings 404 situated between inner race 402*a* and outer race 402*b* may reduce friction forces that inhibit the relative rotation of elevating shaft 202 and housing 200. Consequently, the inclusion of bearings 404 may reduce the amount of torque required for mobile drive unit 20 to raise docking head 204 and may reduce the amount of energy and/or time expended in raising or lowering loads supported by docking head 204.

Figure 5A:
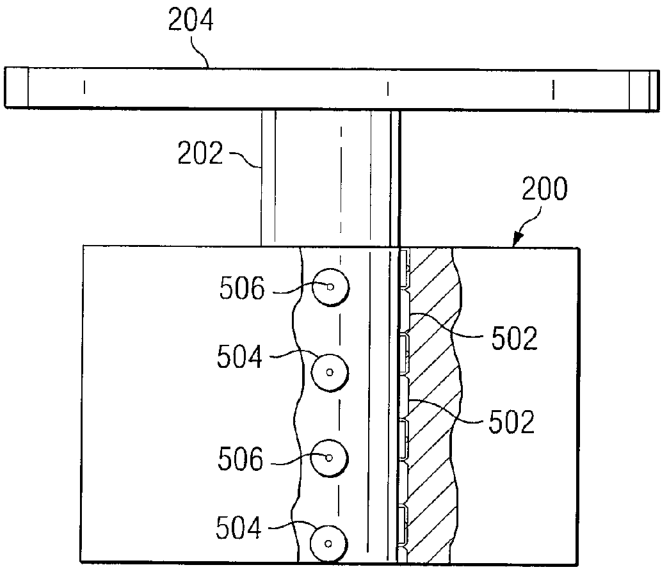
FIGS. 5A-5C illustrate example components and configurations for additional embodiments of the mobile drive unit.
Figure 5B:
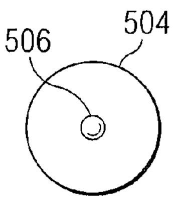
Figure 5C:
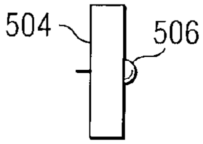

Additionally, in particular embodiments, mobile drive unit 20 may also include recirculating path 206 connecting one endpoint of outer race 402*b* with the other endpoint of outer race 402*b*. The relative rotation of inner race 402*a* and outer race 402*b* may cause bearings 404 to move along races 402. When the rotation of races 402 carries a particular bearing 404 beyond one of the endpoints of outer race 402*b*, the movement of other bearings along races 402 may force the relevant bearing 404 into and through recirculating path 406. As races 402 continue to rotate relative to one another, the relevant bearing 404 is eventually circulated back to the other endpoint of outer race 402*b* where that bearing 404 re-enters outer race 402*b*. FIG. 5A-5C illustrate the components of a particular embodiment of mobile drive unit 20 that utilizes pinned rollers 504 to facilitate the rotation of elevating shaft 202 and housing 200 relative to one another. In particular, FIG. 5A shows a partial cutaway view of such an embodiment of mobile drive unit 20. The example embodiment illustrated in FIG. 5A includes one or more rollers 504 and a race 502.

Similar to races 402 in FIG. 4A, race 502 represents a pathway over which rollers 504 or other rolling or sliding contact elements can move. Although as shown in FIG. 5A, race 502 represents an inner surface of housing 200, in particular embodiments, rollers 504 may be attached to housing 200 and race 502 may represent a surface of elevating shaft 202. Additionally, race 502 is sloped to raise or lower elevating shaft 202 as elevating shaft 202 and housing 200 rotate relative to one another. In particular embodiments, the slope of race 502 may not be constant, and race 502 may include one or more plateaus (not shown) at appropriate locations along race 502. In such embodiments, when elevating shaft 202 is fully extended, rollers 504 may all be located in the middle of one of these plateaus. As a result, in such embodiments, mobile drive unit 20 may then be able to perform small rotations without raising or lowering elevating shaft 202.

Rollers 504 may represent any appropriate components of any suitable shape attached to either elevating shaft 202 or housing 200 and capable of rolling along race 502. Rollers 504 may be attached to elevating shaft 202 or to housing 200 in any suitable manner. FIGS. 5B and 5C show front and side views, respectively, of one embodiment of roller 504 in which roller 504 represents a cylindrical disk. As show in FIG. 5A, in particular embodiments, rollers 504 are pinned to elevating shaft 202 by bolts or other suitable fasteners (represented in FIGS. 5A-5C by pins 506).

In operation, elevating shaft 202 rotates relative to race 502 when mobile drive unit 20 rotates housing 200. As a result of this rotation, rollers 504 roll along race 502. Because race 502 is sloped, rollers 504 rise or fall as they traverse race 502. Furthermore, because rollers 504 are pinned to elevating shaft 202 this also causes elevating shaft 202 to rise or fall. In particular embodiments, use of this rolling action to raise and lower elevating shaft 202 may result in lower friction forces than in embodiments of mobile drive unit 20 that utilize a conventional screw. Consequently, the inclusion of rollers 504 may also reduce the amount of torque required for mobile drive unit 20 to raise docking head 204 and may reduce the amount of energy and/or time expended in raising or lowering loads supported by docking head 204.

Figure 6:
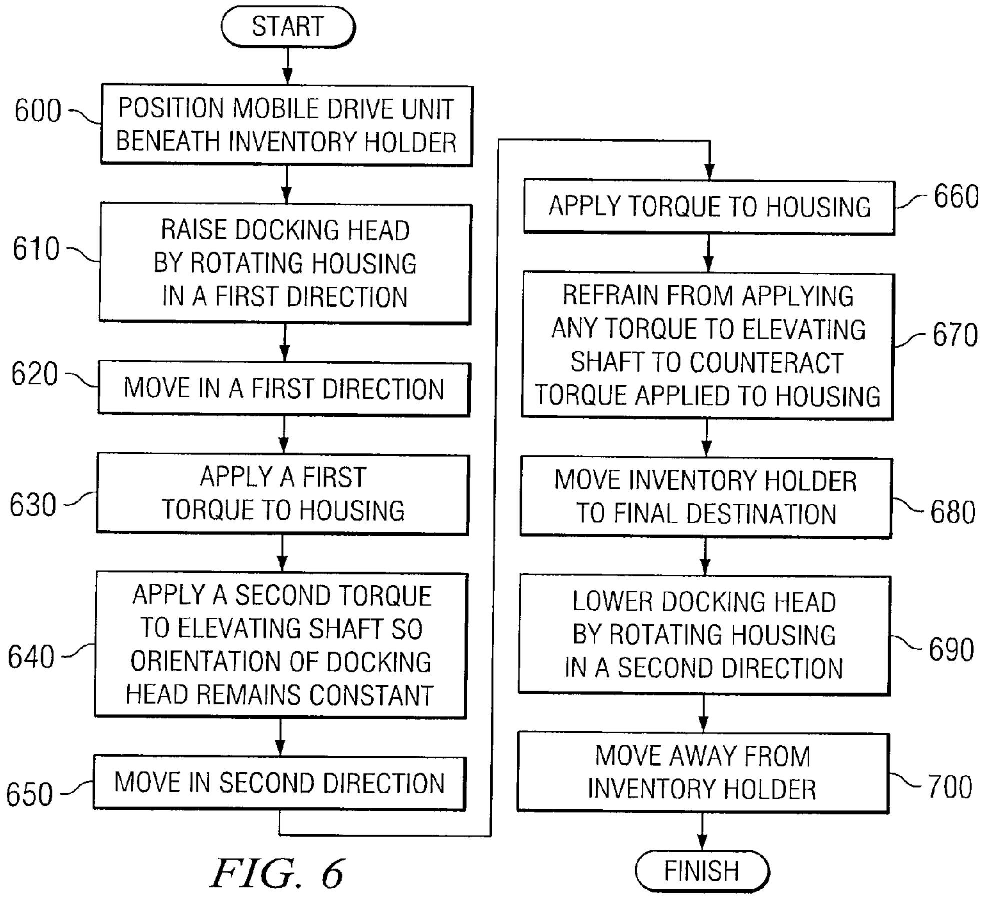
FIG. 6 is a flowchart illustrating example operation of a particular embodiment of the mobile drive unit in moving an inventory holder between locations within the inventory system.

FIG. 6 is a flowchart illustrating example operation of a particular embodiment of mobile drive unit 20. Some of the steps illustrated in FIG. 6 may be combined, modified, or deleted where appropriate, and additional steps may also be added to the flowchart. Additionally, the steps may be performed in any suitable order without departing from the scope of the invention.

In this example, operation begins with mobile drive unit 20 positioning itself beneath a selected inventory holder at a first location at step 600. Once mobile drive unit 20 positions itself beneath the selected inventory holder 30, mobile drive unit 20 may begin a docking process. As part of this process, mobile drive unit 20 may raise docking head 204 at step 610. In particular embodiments, mobile drive unit 20 raises docking head 204 by rotating housing 200 in a first direction relative to elevating shaft 202. Mobile drive unit 20 may then execute any other appropriate steps to complete the docking process based on the configuration of mobile drive unit 20 and the selected inventory holder 30. As a result of the docking process, mobile drive unit 20 is coupled to and/or supports the inventory holder 30.

Mobile drive unit 20 may then move the selected inventory holder 30 to a destination where inventory items 40 may be picked from inventory holder 30, replenished, counted, or otherwise processed and/or where inventory holder 30 may be stored until used by inventory system. In the described example, mobile drive unit 20 is capable of moving in a forward and backward direction and rotating. Thus, mobile drive unit 20 moves to the destination by performing an appropriate combination of straight-line movements and rotations. Furthermore, while rotating to change its direction of travel, mobile drive unit 20 may maintain the orientation of the selected inventory holder 30 to prevent the selected inventory holder 30 from colliding with other objects or components in inventory system 10.

An example of this movement is shown in FIG. 6 at steps 620-650. More specifically, while moving the selected inventory holder 30 to the destination, mobile drive unit 20 moves in a first direction at step 620. At step 630, mobile drive unit 20 applies a first torque to its housing 200 using, at least in part, a first actuator 222. Furthermore, at step 640, mobile drive unit 20 applies a second torque to elevating shaft 202 using, at least in part, a second actuator 222, so that an orientation of docking head 204 remains substantially constant while first actuator 222 applies the first torque to housing 200. As a result, the first torque causes housing 200 (including, in this example, drive module 206, rotation module 208, and processing module 212) to rotate and take on a different orientation. Meanwhile, the second torque prevents elevating shaft 202 and docking head 204 from rotating (relative to objects other than housing 200 and those components that housing 200 connects to and/or encloses). Consequently, in the described example, mobile drive unit 20 changes its orientation without changing the orientation of inventory holder 30. Mobile drive unit 20 may then move in a second direction at step 650.

When mobile drive unit 20 arrives at the destination, mobile drive unit 20 may rotate inventory holder 30 to present a particular face of inventory holder 30 to an operator of inventory system 10, for example, to allow the operator to select an inventory holder 30 from a bin accessible through the presented face. As a result, mobile drive unit 20 may rotate both mobile drive unit 20 and inventory holder 30. This is illustrated in FIG. 6 at steps 660-670.

More specifically, mobile drive unit 20 applies a torque to housing 200 at step 660 using the first actuator 222. While applying this torque, mobile drive unit 20 does not apply any torque to elevating shaft 202 to counteract the torque applied to housing 200. As a result, the applied torque rotates both mobile drive unit 20 and inventory holder 30 at step 670.

After any appropriate actions are taken by the operator with respect to the selected inventory holder 30, mobile drive unit 20 may move the selected inventory holder 30 to a storage location or another final destination at step 680. In particular embodiments, mobile drive unit 20 then lowers docking head 204 by rotating housing 200 in a second direction relative to elevating shaft 202 at step 690. Mobile drive unit 20 may then execute any other appropriate steps to complete the undocking process based on the configuration of mobile drive unit 20 and the selected inventory holder 30. As a result of this undocking process, mobile drive unit 20 is no longer coupled to or supports the inventory holder 30. Mobile drive unit 20 may then move away from the selected inventory holder 30, at step 700, and begin completing other tasks within inventory system 10 or elsewhere. Operation of mobile drive unit 20 with respect to transporting the selected inventory holder 30 may then end as shown in FIG. 6.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
- a housing;
- a drive module operable to selectively propel the apparatus in at least a first direction;
- a docking head operable to at least one of couple to and support an inventory holder;
- an elevating shaft connected to the docking head and operable to raise the docking head when the housing is rotated relative to the elevating shaft; and
- a rotation module operable to induce rotation in the housing relative to the elevating shaft, the rotation module comprising:
  - a first actuator operable to rotate the housing; and
  - a second actuator operable to apply a torque to the elevating shaft so that an orientation of the docking head remains substantially constant while the first actuator rotates the housing.

2. The apparatus of claim 1, wherein the drive module is operable to position the apparatus under an inventory holder, and wherein the apparatus is operable to dock with the inventory holder, at least in part, by raising the docking head towards the inventory holder.

3. The apparatus of claim 1, further comprising a braking element operable to prevent the docking head from rotating when activated, and wherein the apparatus is operable to:
- activate the braking element; and
- rotate the housing while the braking element is activated.

4. The apparatus of claim 3, wherein the braking element comprises one or more feet that, when deployed, press against a surface on which the apparatus is resting, and wherein the one or more feet are operable to prevent the docking head from rotating when deployed.

5. The apparatus of claim 1, wherein the rotation module comprises all or a portion of the drive module.

6. The apparatus of claim 5, wherein:
- the drive module comprises a first wheel and a second wheel and is further operable to propel the apparatus in the forward direction by rotating the first wheel and the second wheel in a first direction and to propel the apparatus in the backward direction by rotating the first wheel and the second wheel in a second direction; and
- the rotation module comprises the first wheel and the second wheel and wherein the rotation module is further operable to induce rotation in the housing by rotating the first wheel and the second wheel in opposite directions.

7. The apparatus of claim 1, further comprising a processing module operable to selectively instruct the rotation module to perform one of a first rotation movement and a second rotation movement, wherein:
- the first rotation movement comprises rotating the housing without substantially changing an orientation of the docking head; and
- the second rotation movement comprises rotating the docking head while rotating the housing.

8. The apparatus of claim 1, wherein the elevating shaft comprises a threaded shaft.

9. The apparatus of claim 1, wherein the elevating shaft is operable to raise the docking head when the housing is rotated in a first direction relative to the elevating shaft; and wherein the elevating shaft is further operable to lower the docking head when the housing is rotated in a second direction relative to the elevating shaft.

10. A method for transporting inventory items, comprising:
positioning a mobile drive unit beneath an inventory holder at a first location, wherein the mobile drive unit comprises:
a housing;
a docking head; and
an elevating shaft, wherein the docking head is connected to the elevating shaft and wherein the elevating shaft is operable to raise the docking head when the housing is rotated relative to the elevating shaft;
raising the docking head with the elevating shaft by rotating the housing relative to the elevating shaft, wherein rotating the housing relative to the elevating shaft comprises:
applying a first torque to the housing a first actuator; and
applying a second torque to the shaft using a second actuator so that an orientation of the docking head remains substantially constant while the first actuator applies the first torque to the housing;
docking the mobile drive unit with the inventory holder so that the docking head at least one of couples to and supports the inventory holder; and
moving the mobile drive unit and the inventory holder to a second location.

11. The method of claim 10, wherein the mobile drive unit further comprises a braking element operable to prevent the docking head from rotating when activated, and rotating the housing relative to the elevating shaft comprises:
activating the braking element; and
applying a torque to the housing while the braking element is activated.

12. The method of claim 11, wherein the braking element comprises one or more feet operable, when deployed, to press against a surface on which the apparatus is resting, and wherein activating the braking element comprises deploying the one or more feet.

13. The method of claim 10, wherein moving the first unit to the second location comprises:
moving the mobile drive unit in a first direction to the second location;
rotating the mobile drive unit without changing an orientation of the docking head while rotating the mobile drive unit; and
moving the mobile drive unit in a second direction to a third location.

14. The method of claim 13, further comprising rotating the mobile drive unit and the docking head at the third location to present a particular face of the inventory holder to an operator.

15. The method of claim 10, wherein raising the docking head with the elevating shaft comprises raising the docking head with the elevating shaft by rotating the housing in a first direction relative to the elevating shaft, and further comprising lowering the docking head by rotating the housing in a second direction relative to the elevating shaft.

16. A system for transporting inventory items, comprising:
a plurality of inventory holders, each operable to store inventory items; and
a mobile drive unit, comprising:
a housing;
a drive module operable to selectively propel the apparatus in a forward direction and a backward direction, wherein the drive module is further operable to position the mobile drive unit under a selected one of the inventory holders;
a docking head operable to at least one of couple to or support the selected inventory holder when the mobile drive unit is docked with the selected inventory holder;
an elevating shaft connected to the docking head and operable to raise the docking head when the housing is rotated relative to the elevating shaft; and
a rotation module operable to induce rotation in the housing relative to the elevating shaft, the rotation module comprising:
a first actuator operable to rotate the housing; and
a second actuator operable to apply a torque to the elevating shaft so that an orientation of the docking head remains substantially constant while the first actuator rotates the housing.

17. The system of claim 16, wherein the mobile drive unit further comprises a load control module operable to maintain an orientation of the selected inventory holder when the housing rotates relative to the elevating shaft.

18. An apparatus for transporting inventory items, comprising:
means for positioning a mobile drive unit beneath an inventory holder at a first location, wherein the mobile drive unit comprises:
a housing;
a docking head; and
an elevating shaft, wherein the docking head is connected to the elevating shaft and wherein the elevating shaft is operable to raise the docking head when the housing is rotated relative to the elevating shaft
means for raising the docking head with the elevating shaft by rotating the housing relative to the elevating shaft, wherein the means for raising the docking head comprises:
means for applying a first torque to the housing; and
means for applying a second torque to the shaft so that an orientation of the docking head remains substantially constant while the first torque is applied to the housing;
means for docking the mobile drive unit with the inventory holder so that the docking head one of couples to and supports the inventory holder; and
means for moving the mobile drive unit and the inventory holder to a second location.

* * * * *